United States Patent
Pang et al.

(10) Patent No.: US 7,131,664 B1
(45) Date of Patent: Nov. 7, 2006

(54) AIRBAG WITH A STRATEGICALLY PLACED RECESS

(75) Inventors: Hyunsok Pang, Rochester Hills, MI (US); Mutaz Shkoukani, Macomb, MI (US); Soonsik Kim, Rochester Hills, MI (US); Jae-Sung Yang, Bloomfield, MI (US); Prem Hariharan, Shelby Township, MI (US); Prabhakar Padiyar, Sterling Heights, MI (US); Jin Ho Jung, Rochester Hills, MI (US); Robert Sadenwater, Clarkston, MI (US); Chang Ju, Rochester, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 0 days.

(21) Appl. No.: 11/341,791

(22) Filed: Jan. 28, 2006

Related U.S. Application Data

(63) Continuation-in-part of application No. 11/252,426, filed on Oct. 17, 2005.

(51) Int. Cl.
*B60R 21/16* (2006.01)

(52) U.S. Cl. ............................... 280/743.2

(58) Field of Classification Search ............. 280/743.1, 280/743.2, 729
See application file for complete search history.

(56) References Cited

U.S. PATENT DOCUMENTS

| | | | |
|---|---|---|---|
| 3,879,057 A * | 4/1975 | Kawashima et al. | 280/743.2 |
| 5,213,361 A * | 5/1993 | Satoh et al. | 280/730.1 |
| 5,997,037 A | 12/1999 | Hill et al. | |
| 6,616,184 B1 | 9/2003 | Fischer | |
| 2003/0218325 A1 | 11/2003 | Hasebe et al. | |
| 2004/0155439 A1 | 8/2004 | Hasebe et al. | |
| 2004/0232681 A1 | 11/2004 | Adomeit | |
| 2005/0110249 A1 | 5/2005 | Hasebe et al. | |
| 2005/0161918 A1 | 7/2005 | Bito | |
| 2005/0212275 A1 | 9/2005 | Hasebe | |
| 2006/0028009 A1 | 2/2006 | Hasebe et al. | |
| 2006/0043707 A1 | 3/2006 | Hasebe et al. | |
| 2006/0066089 A1 | 3/2006 | Hasabe et al. | |
| 2006/0186656 A1 * | 8/2006 | Kumagai | 280/743.2 |

FOREIGN PATENT DOCUMENTS

| | | | |
|---|---|---|---|
| JP | 04292239 | | 10/1991 |
| JP | 10071911 A | * | 3/1998 |
| JP | 11005505 A | | 1/1999 |
| JP | 11321506 A | * | 11/1999 |
| JP | 2001233157 A | | 8/2001 |
| JP | 2005088686 A | | 4/2005 |
| JP | 2005162195 A | | 6/2005 |
| JP | 2005247118 A | | 9/2005 |
| JP | 2005280470 A | | 10/2005 |

* cited by examiner

*Primary Examiner*—Faye M. Fleming
(74) *Attorney, Agent, or Firm*—Lonnie Drayer

(57) ABSTRACT

An airbag (10) has an inflatable chamber (301) defined by a main front panel (12) and a pair of side panels (24), (26). The airbag (10) has a vertically oriented recessed portion (20) on the main panel (12) located on a lower portion of an airbag (10), preferably vertically at or below a gas inlet passageway (30). The recessed portion (20) divides the airbag (10) into two lower lobe portions (40, 42) on each side of the recessed portion (20). Upon inflation an internal tether (50) is attached to the recessed portion (20) and is anchored at or adjacent to the gas inlet passageway (30) thereby limiting forward movement of the recessed portion (20) upon inflation. The airbag (10) is useful as a frontal airbag, particularly a passenger frontal airbag.

17 Claims, 13 Drawing Sheets

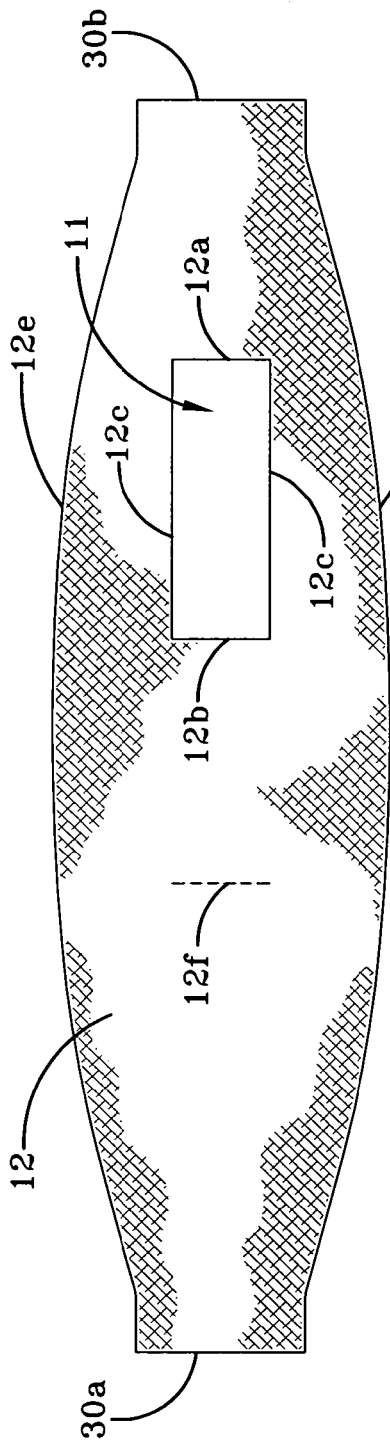
FIG-5A
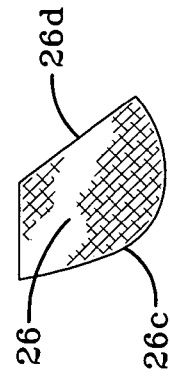
FIG-5D
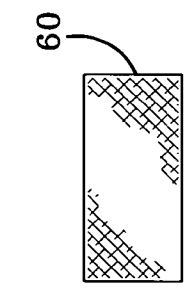
FIG-5E
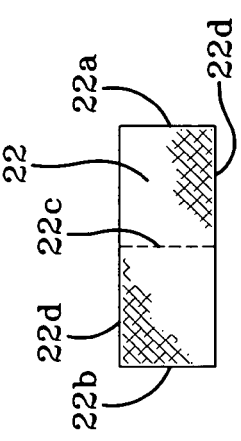
FIG-5C
FIG-5F
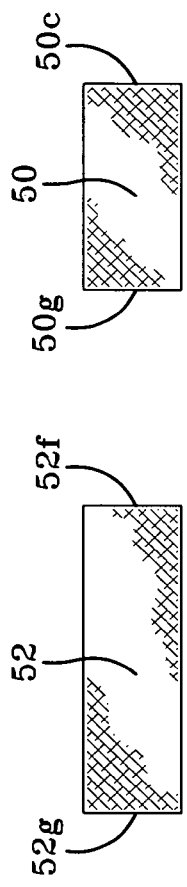
FIG-5G
FIG-5H

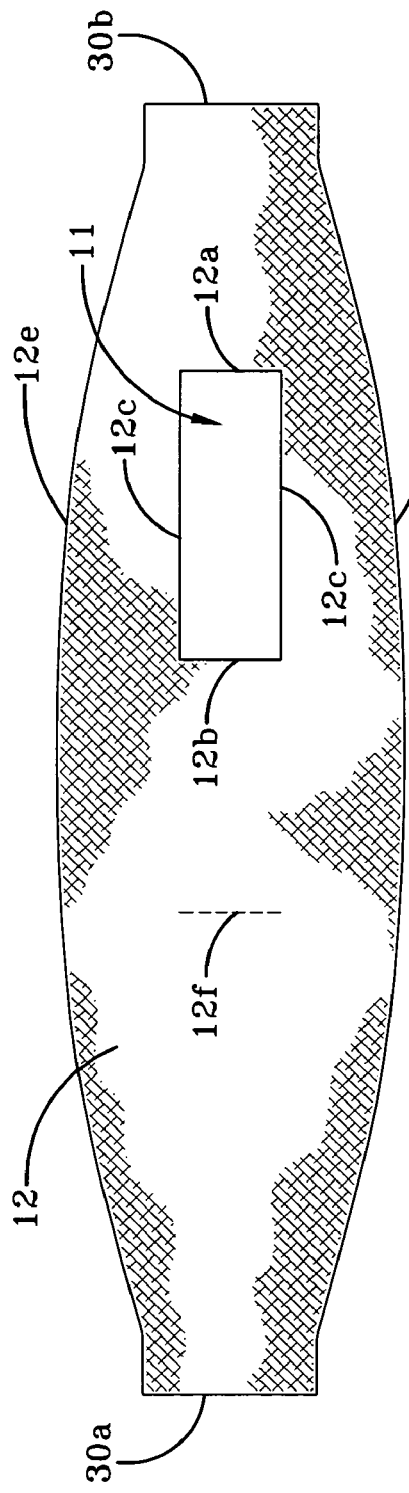
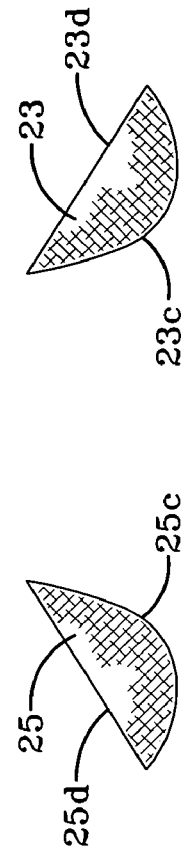
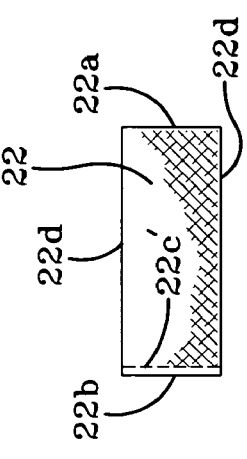
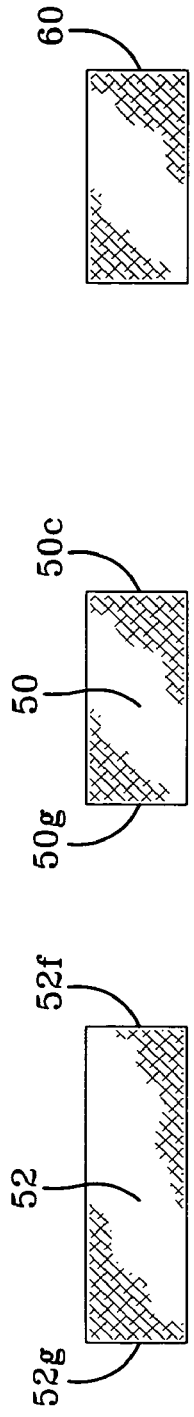
FIG-6A
FIG-6C
FIG-6D
FIG-6E
FIG-6F
FIG-6G
FIG-6H

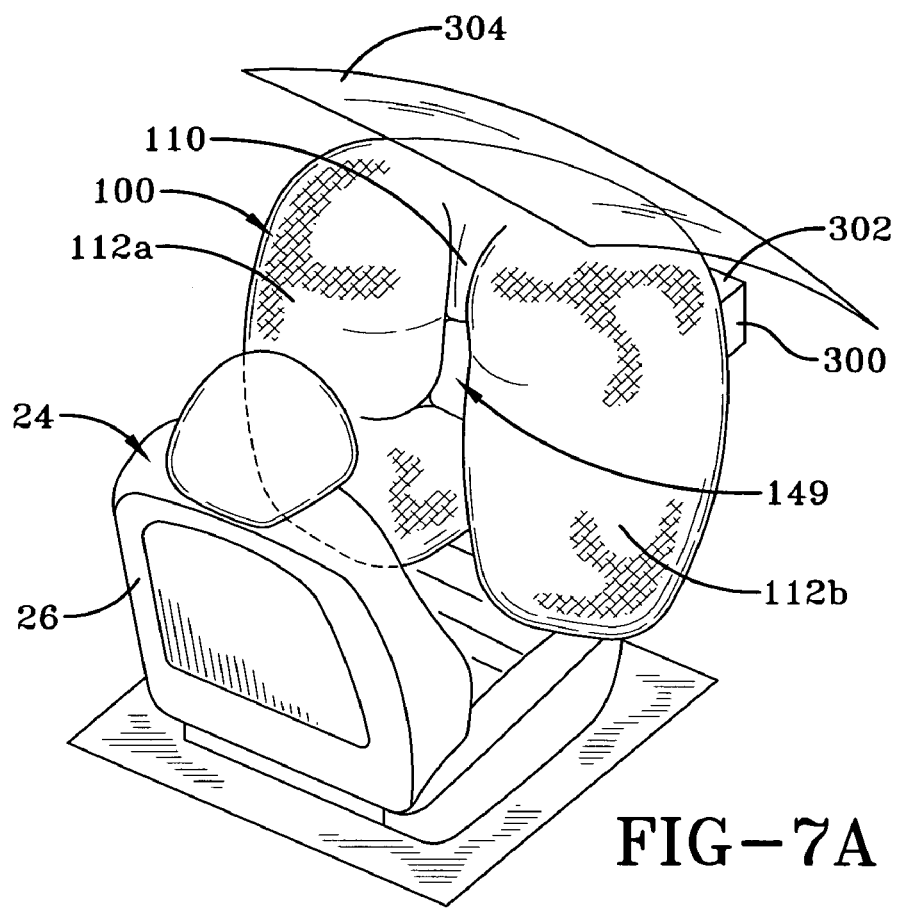
FIG-7A
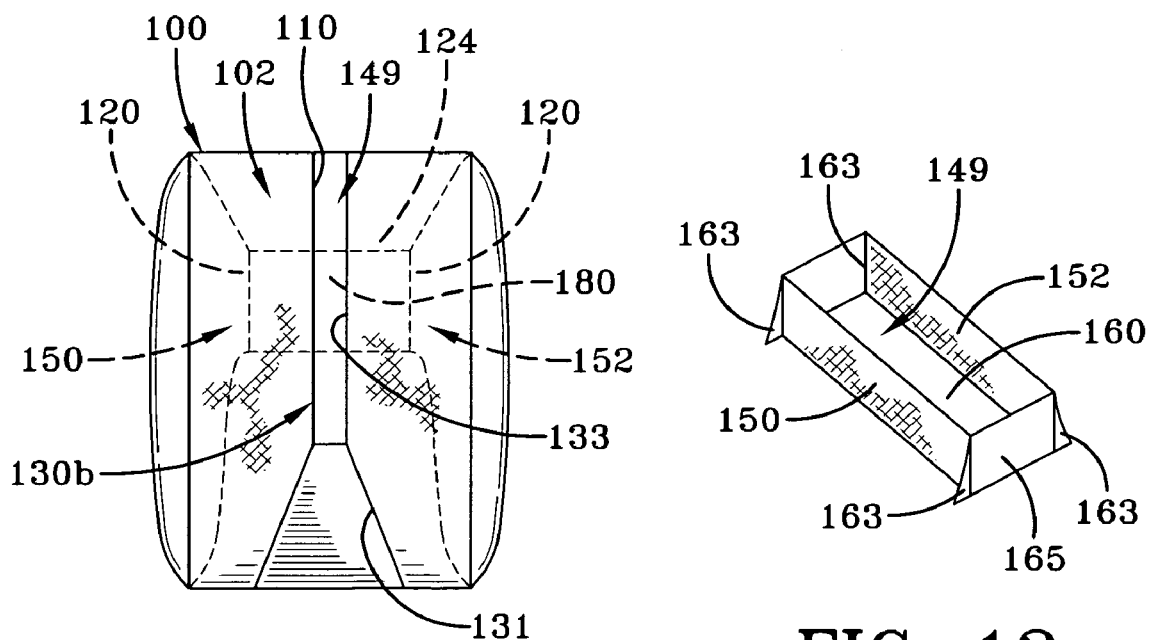
FIG-10A
FIG-12

AIRBAG WITH A STRATEGICALLY PLACED RECESS

RELATED APPLICATIONS

This application is a Continuation in Part of U.S. patent application Ser. No. 11/252,426 filed on 17 Oct. 2005 entitled "Grooved Air Bag".

FIELD OF THE INVENTION

This invention relates to passenger side airbags deployed from an instrument panel of a vehicle.

BACKGROUND OF THE INVENTION

As shown in prior art FIG. 13, a conventional passenger side airbag 200 is inflated by an airbag inflator 280. The airbag 200 typically has a single inflatable chamber 330 inflated by gas from the inflator 280. The face portion or front panel 320 of the airbag 200 impacts the vehicle occupant 220 along the chest, shoulders and head. As the vehicle occupant's seated position at the time of airbag deployment deviates from the normal seated position by taking a position closer to the vehicle's instrument panel relative to the seat back 260 of the seat 240, the velocity at which the airbag impacts the vehicle occupant increases. If the vehicle occupant's body is on or near the cover of the airbag module at the time of airbag deployment, the level of interaction between the vehicle occupant and the airbag is elevated.

The use of such conventional passenger side airbags is known to create a risk of injury of small children and infants as well as out of position vehicle occupants. Regulations and standards have been established along with numerous safety tests to insure the deployment of an airbag can either avoid or minimize a risk of injury.

The most common solutions require the use of weight, size or location sensors that signal a processor to control the rate at which inflation gas is provided by the inflator dependent upon the size and the position of the gas is provided by the inflator dependent upon the size and the position of the vehicle occupant. These sensors are costly and very sophisticated and require a very high degree of reliability to insure they function over the life of a vehicle.

To date none of the systems commonly used can accommodate the deployment of an airbag towards an infant in an infant seat facing the rear of a vehicle in the front seat of a vehicle. Accordingly all vehicle manufacturers provide warnings against such an occurrence.

With reference to prior art FIG. 14, it has been proposed that an airbag 200a be formed with spaced apart lobes 340a, 340b, separated by a groove or space 360. When this airbag 200a is inflated, it will take the shape shown in which the space or groove 360 is positioned in front of the normally seated vehicle occupant 220, thereby avoiding contact with the vehicle occupant's head. The airbag-occupant loading is primarily between the lateral lobes 340a, 340b in relation to the right and left sides of the vehicle occupant's torso and the right and left shoulders of the vehicle occupant 220. The impact is lessened if the vehicle occupant 220 is out of position relative to the center of the seat 240 or the seat back 260 at the beginning of airbag deployment.

In the United States of America the National Highway Transportation Safety Administration test criteria of a 1 year old, a 3 year old, a 6 year old; a 105 pound female ($5^{th}$ percentile) are each considered sufficiently different to warrant separated criteria for airbag deployment beyond that of a normal size and weight adult vehicle occupant. Similarly, pregnant women have unique requirements to insure survivability of the infant they are carrying. These and other factors make the design and construction of such safety devices very complex while no other device other than the seatbelt is credited with saving more lives and minimizing the occurrence of serious injury.

It is a primary objective of the vehicle occupant safety restraints industry to provide vehicle occupant restraint devices with a maximum range of safety for the greatest number of potential uses at the highest possibility reliability while still being affordably priced. In science and engineering a constant truth is that "simplicity leads to reliability". The trend toward complex sensors and controls increases the number of components, which inherently leads to increasing the risk of a component malfunction that reduces the overall reliability. To avoid this problem engineers are forced to design in redundancy, which further drives up cost.

SUMMARY OF THE INVENTION

An airbag has an inflatable chamber defined by a main panel and a pair of side panels. The main panel has a top portion, a front portion and a bottom portion. The airbag has a vertically oriented recessed portion on the main panel located on a lower portion of the airbag, preferably located vertically at or below a gas inlet passageway and extending from the front portion to the lower portion. The recess portion divides the airbag into two lower lobe portions on each side of the recess portion. Upon inflation an internal tether that is attached to the recess portion and is anchored at or near the gas inlet passageway limits forward movement of the recess portion. The airbag is useful as a frontal airbag, particularly a passenger side frontal airbag.

The present invention provides an airbag that can meet the test criteria for a 1 year old infant, a 3 year old, a 6 year old and a $5^{th}$ percentile woman while still meeting the design standards for a $50^{th}$ percentile adult passenger.

An airbag according to the present invention can provide these performance capabilities with a standard inflator.

An airbag system according to the present invention can perform without requiring any sophisticated vehicle occupant weight or position sensors.

The airbag design of the present invention is such that it achieves an inherent very high reliability without any significant cost penalty.

BRIEF DESCRIPTION OF THE DRAWINGS

FIGS. 5A through 5H are plan views of the various airbag components shown prior to being sewn together.

FIGS. 6A through 6H are plan views of an alternative embodiment of the airbag showing the panels and other components in plan view prior to assembly wherein the recess side panels and tethers are modified from the embodiment shown in FIGS. 1 through 5G.

FIG. 7A is an isometric view of the airbag of FIG. 7 shown inflated in relation to a vehicle's windshield and seat.

FIG. 10A shows another alternative of the airbag of FIG. 7.

FIG. 12 shows still another alternative of the airbag of FIG. 7

DETAILED DESCRIPTION OF THE INVENTION

Figure 1:
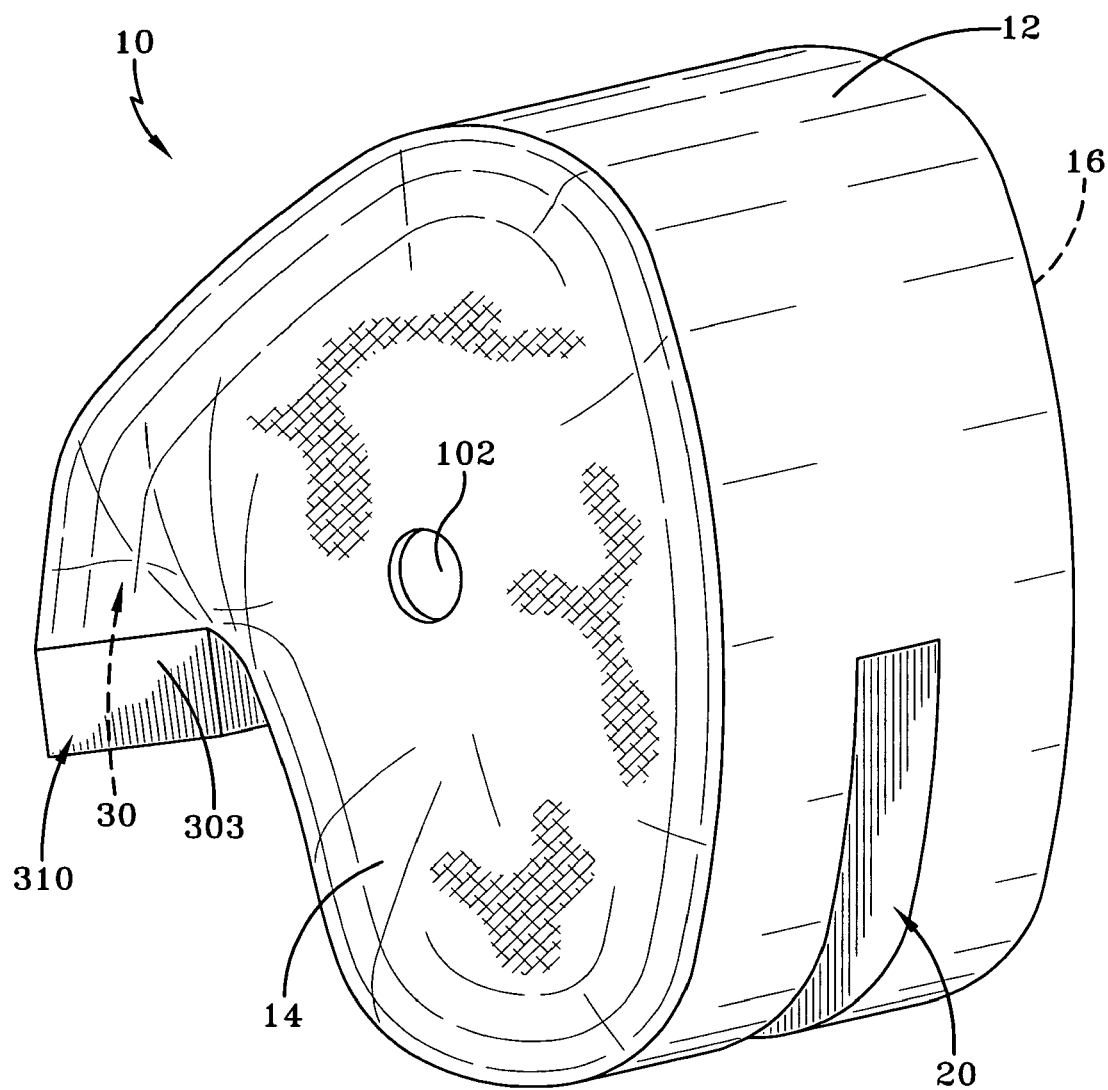
FIG. 1 is perspective view of an airbag according to the present invention shown in a deployed and inflated condition.
Figure 2:
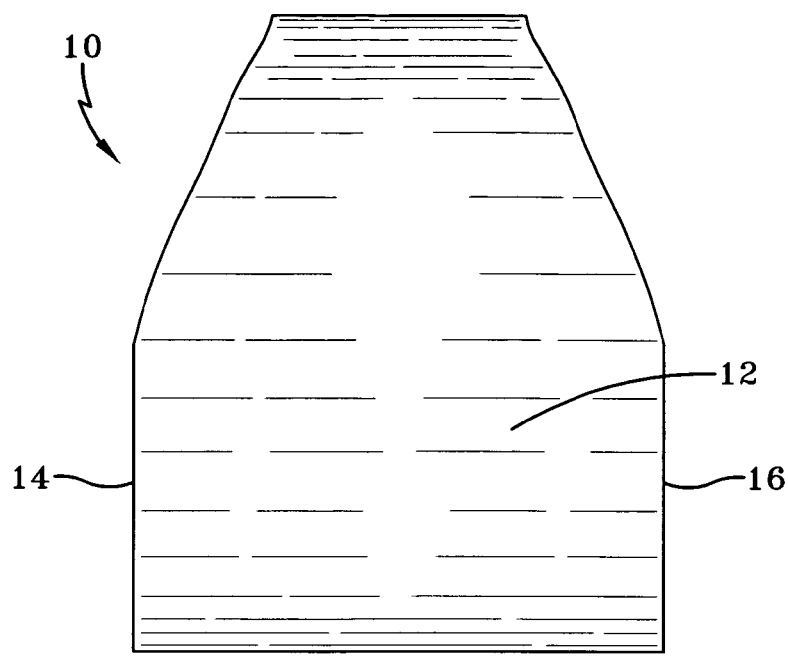
FIG. 2 is a top view looking down at the airbag of FIG. 1.
Figure 3:
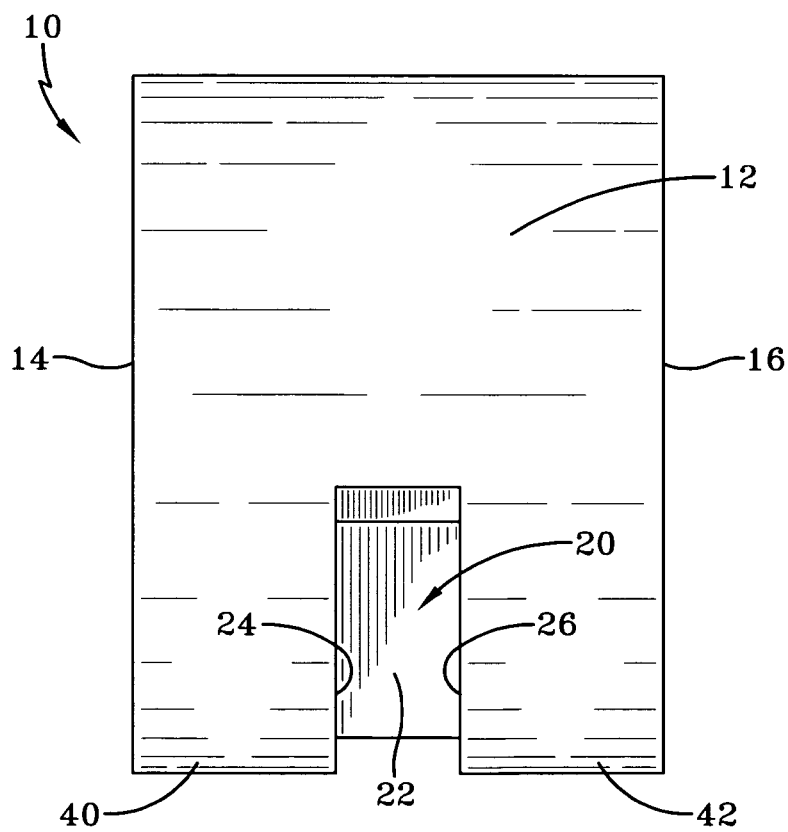
FIG. 3 is a front view of the airbag of FIG. 1.

With reference to FIGS. 1 through 5H the present invention according to a preferred embodiment is illustrated. Shown in FIG. 1 is an airbag 10 that has a main panel 12 and two side panels 14, 16. The main panel 12 has a top portion, a front portion and a bottom portion and as shown in FIG. 5A can be made from a single panel of airbag fabric. The combination of the main panel 12 and side panels 14, 16 define a single inflatable chamber 301. The inflatable chamber 301 has an opening formed by the ends of the main panel cooperating with the side panels to create a passageway 30 that allows inflation gas to enter the inflatable chamber 301 and inflate the airbag 10. With further reference to FIG. 1 a recessed portion 20 of the airbag is shown. The recessed portion 20 illustrated in FIG. 3 has a center recess panel 22, a left recess panel 24 and a right recess panel 26, the combination of which forms a recessed portion 20 within the main panel 12. The term "recess" as used herein means a concavity in the surface, such as an enclosure that is set back or indented. As further shown, this recessed portion 20 divides the airbag 10 into two lower lobe portions 40, 42. The lower lobe portions 40, 42 are spaced apart by the recessed portion 20 in an amount sufficient to allow each lobe portion to act somewhat independently upon inflation. As shown in FIG. 3 the lobe portions 40, 42 are preferably in the front and lower portions of the main panel 12 when the airbag is in a fully deployed state and are fully open to form a part of the single inflatable chamber 301.

Figure 5:
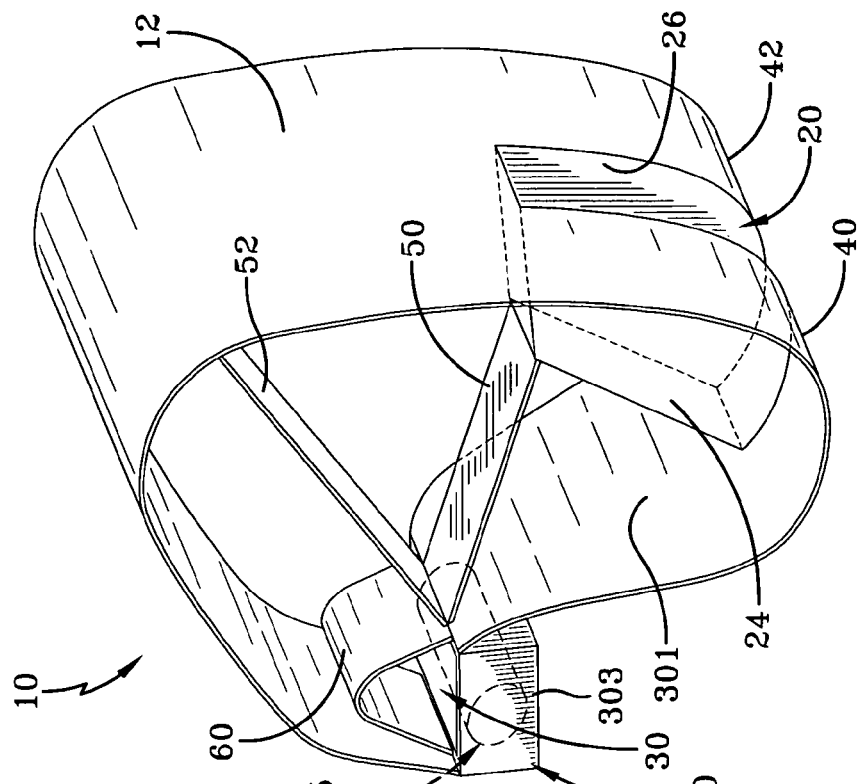
FIG. 5 is the perspective view of FIG. 4 with both side panels removed.
Figure 4:
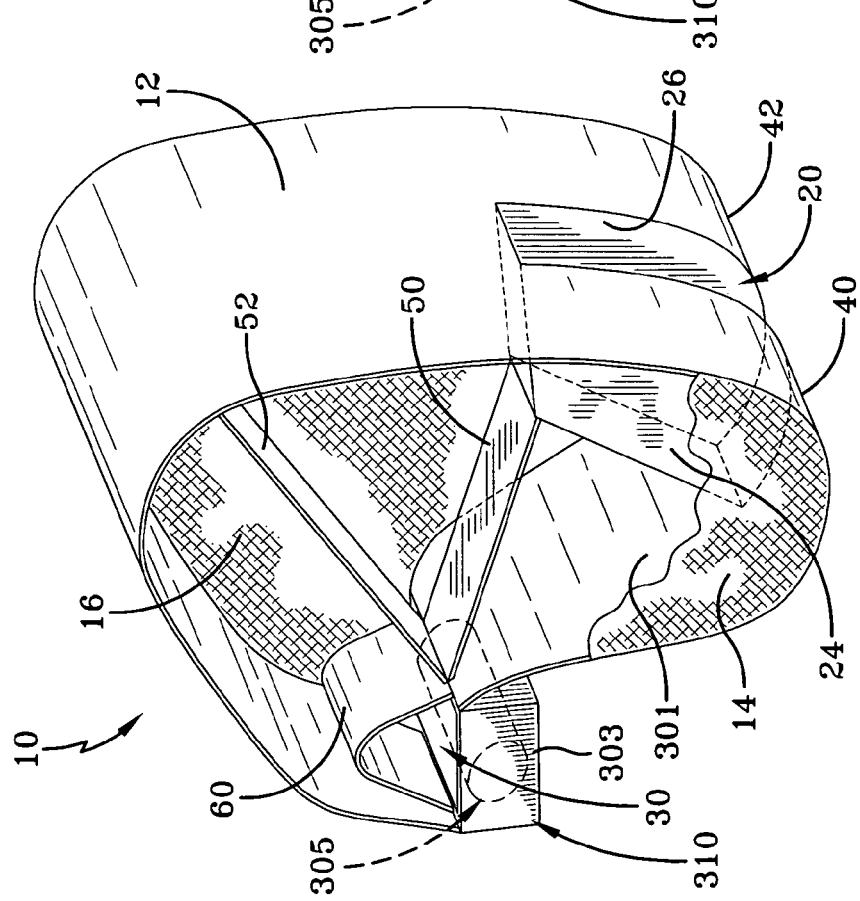
FIG. 4 is a perspective view of the airbag of FIG. 1 with most of the left side panel removed to show the internal tethers and diffuser components.

With reference to FIGS. 4 and 5, the airbag 10 in a deployed condition is shown with one or both side panels 14, 16 removed so that the inflatable chamber 301 of the airbag 10 can be more easily observed. In the interior of the airbag 10, the center recessed panel 22 of the recessed portion 20 is connected to a tether 50. The tether 50 extends towards the gas inlet passageway 30. The gas inlet passageway 30 is designed to mate with and be attached to an airbag module housing 303 adapted to house both the airbag 10 and an inflator 305 to form an airbag module assembly 310 such that when a crash is sensed by a crash sensor and an actuating signal is sent to the inflator 305 the inflator provides gases that inflate and propel the airbag 10 outwardly from the instrument panel of the vehicle. The airbag 10 near the gas inlet passageway 30 has an end anchored or otherwise attached to the module housing 303 or other means for securing the airbag. As shown, the forward movement of the recessed portion 20 is limited by the tether 50. Preferably, a second tether 52 is provided that further restrains the upward movement and forward movement of the airbag 10 in such a fashion that both the upper portion of the airbag 10 and the lower portion of the airbag 10 are restrained from excess forward movement by the tethers. When the term "forward" is used herein and in the claims with respect to the deployment of an airbag it is understood to mean a direction toward a vehicle occupant.

A diffuser element 60 is shown. The diffuser element 60 as shown in FIG. 5H is a separate fabric component; but alternatively the diffuser element 60 may be an integral part of one or both of the tethers 50, 52. In either form the diffuser element 60 provides a means for deflecting the glow of inflation gases entering the airbag from the inflator laterally towards the side panels 14, 16 as the airbag is unfolding. As a direct result of the position of the diffuser element 60 the gas flow is not in a direct normal or straight line flow pattern. The inflation gas follows a path that is first laterally directed toward either side of the airbag 10 and then moves forward which helps slow the deployment rate and the energy thrust of the airbag 10 as it is deploying.

An important aspect of the present invention is that the recessed portion 20 is located only at a lower portion of the deployed airbag extending vertically from the front portion to the bottom portion of the main panel 12. As shown the recessed portion 20 is located at or below the location of the gas inlet passageway 30 relative to a horizontal plane passing through the gas inlet passageway when the airbag is in a deployed state. As shown the gas inlet passageway 30 has the inflation gas moving in an upward direction and then deflected by the diffuser element 60. The recessed portion 20 being attached by the tether 50 moves outwardly as the airbag 10 is deployed to a point at which the tether 50 becomes taut. At such a point the recessed portion 20 can no longer extend forward towards the vehicle occupant, however, the side lobe portions 40, 42 continue to develop and inflate and they can absorb the energy impact of the vehicle occupant as the vehicle occupant is moving forward during a vehicle crash. Preferably one or more vent openings 102 are strategically positioned on each side of the airbag 10 to facilitate deflation of the airbag after deployment and interaction with the vehicle occupant. Each vent opening as shown is sufficiently sized to permit a release of the contained gases inside the inflated airbag. As shown these vent openings 102 are located in an upper portion on each side panel about midway between the inlet passage 30 and the front portion 12 and above each lobe portion 40, 42. Interestingly the lower lobe portions 40, 42 provide a lower force cushioning effect that is less severe than the top portion of the airbag 10 in that each lobe portion 40, 42 is free to move and deflect inwardly both laterally on the side as well as internally relative to the recessed portion 20. Therefore, an out of position vehicle occupant would compress or depress one lobe portion possibly more than the other lobe portion, but due to the nature of the single inflatable chamber 301 being fully open to that portion created within the lobe portion an easy deflection of this portion is possible such that a small child or infant will not receive a full impact of a conventional airbag upon deployment. This is true because the lobe portion 40, 42 is free to deflect in both directions laterally and also rearwardly back towards the instrument panel. The advantage of this is simple, the airbag geometry is such that a small child or out of position child or a passenger seated close to the airbag will be struck by one or both of the lobe portions 40, 42 and the lobe portions being easily deflected reduces the amount of force applied to the vehicle occupant to greatly reduce the risk of injury. Assuming the vehicle occupant is perfectly centered then portions of both lobe portions 40, 42 can make contact as well as the recessed portion 20 which is restrained by the tether 50 as the airbag 10 inflates and prior to reaching a fully inflated state.

What is particularly advantageous with the present geometry of the airbag 10 is that the airbag geometry itself provides a low deployment force directed at the vehicle occupant at the lower portion of the airbag 10 where children and infants are most vulnerable, whereas the upper portion of the airbag 10 beyond the recessed portion 20 provides a more conventional single faceted airbag which is more than capable of providing sufficient cushioning for a passenger that is an adult vehicle occupant. The airbag structure is such that the airbag 10 can provide a satisfactory performance when inflated with a single stage inflator, many examples of which are well known to those of ordinary skill in the field of vehicle occupant safety restraints. This has a tremendous advantage in improving the reliability of such airbag systems. Nevertheless the airbag 10 is functional with more advanced dual stage pyrotechnic and hybrid inflators and is not limited to use with single stage inflators.

The new regulation criteria requiring that airbags be suitable for a generic family of vehicle occupant sizes means that either the systems become far more complex or alternatively the systems have sensors that will prevent deployment of the airbag. The present invention as illustrated satisfies all these requirements without requiring shutting off the airbag under certain circumstances. This has a tremendous advantage in that under all conditions including slow speed crashes at 40 kilometers per hour (25 miles per hour) or less, the vehicle occupants can be safely cushioned by the airbag without the risk of having a high inflation force propelled into the vehicle occupant which in itself could cause injury.

With reference to FIGS. 5A through 5H, each of the components or panels used to make the airbag of the present invention is illustrated. These panels are typically made of woven airbag fabric of nylon or polyester. In FIG. 5A the main panel 12 is shown. The main panel 12 forms a top, a bottom and a front portion of the airbag 10. The main panel 12 has a symmetrical configuration wherein both ends 30a, 30b neck or narrow down to provide a portion of the gas inlet passageway 30. As shown there is an opening 11 that is surrounded by edges 12a, 12c, 12b, 12c of the opposite side. As shown the opening 11 is rectangular in shape.

Figure 5B:
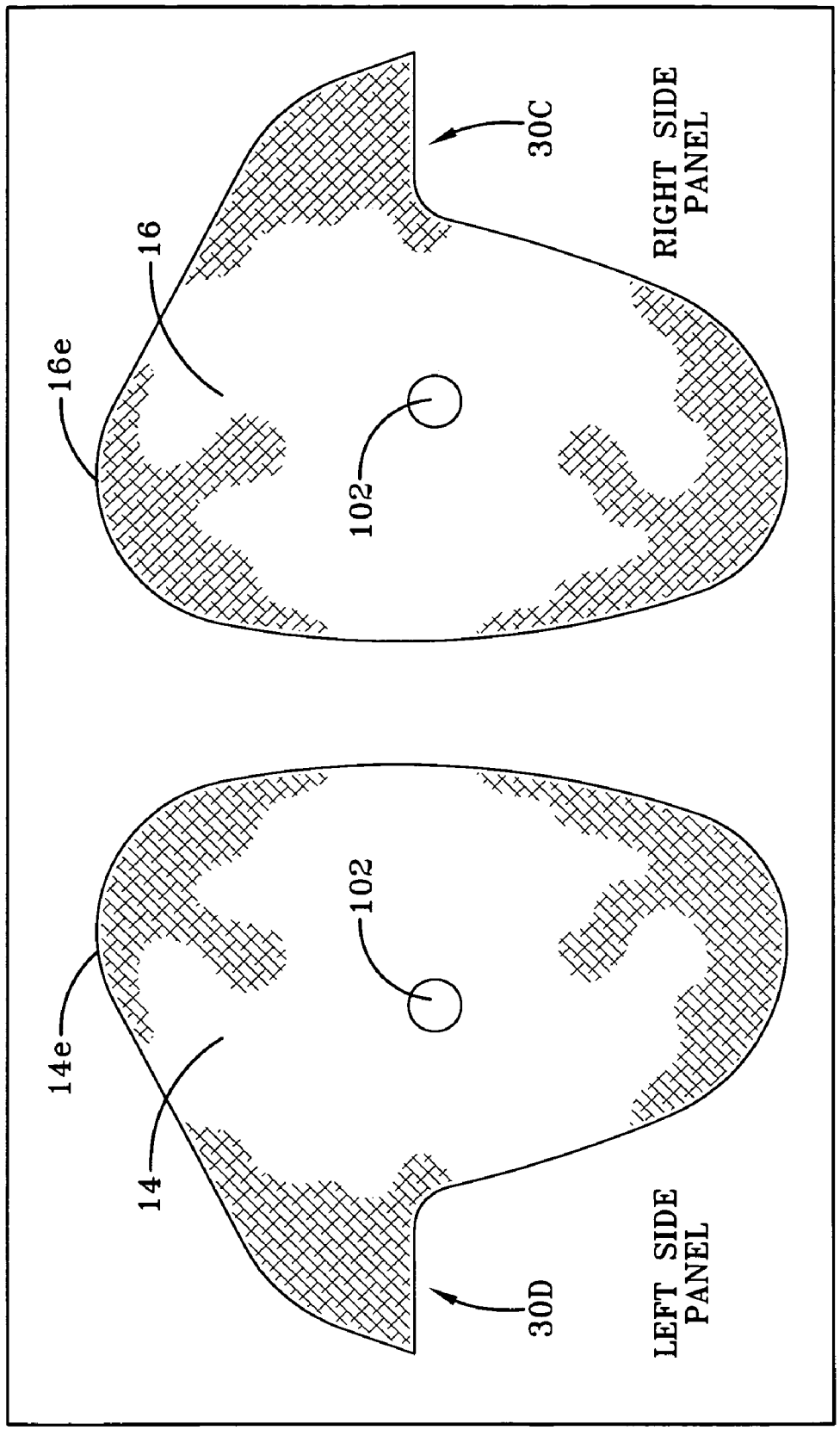
Figure 6B:
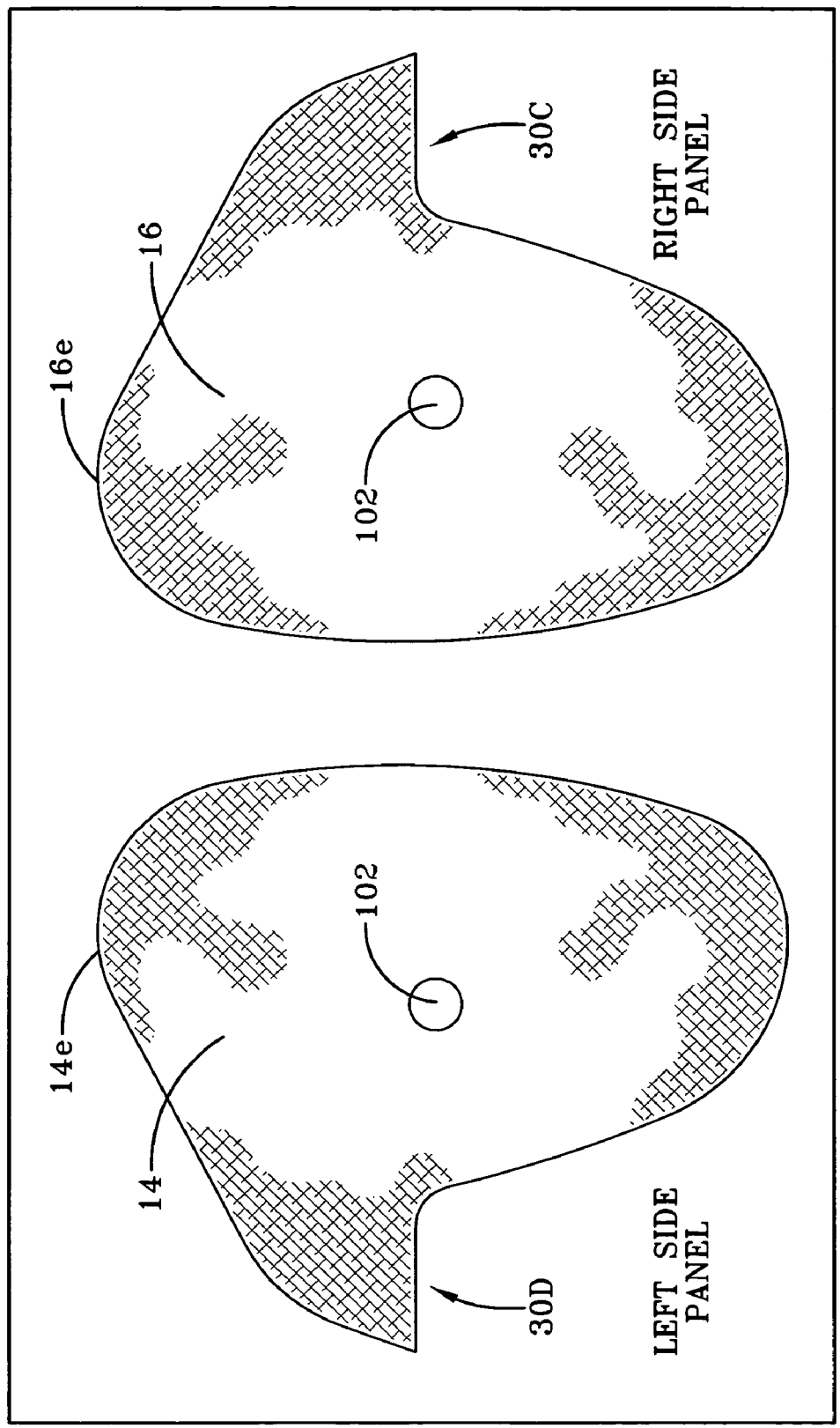

With reference to FIG. 5B, the side panels 14, 16 for the left and right sides of the airbag are shown. The side panel 14 is for the left hand side of the airbag whereas the right hand side of the airbag 16 is illustrated being a mirror image of the side panel 14. As each of the panels 14, 16 has a portion 30d, 30c to provide a portion of the gas inlet passageway 30. Vent openings 102 are provided as shown in FIGS. 5B and 6B on each side panel 14, 16. The edges 14e, 16e of the side panels are attached to the front main panel along the lateral edges 12e of the main panel. The edges of these panels can be sewn or otherwise affixed to one another to make the inflatable chamber 301 previously discussed. The opening 11 in the main panel has been provided with a right hand recess panel and a left-hand recess panel 26, 24 respectively. The right and left hand recess panels 24, 26 are sewn along their curved edges 24c, 26c to edge 12c of the opening 11 in the main panel. Once sewn to each side 12c of the rectangular opening 11 as illustrated, the side recess panels 24, 26 are then sewn at their straight edges 24d, 26d to the center recess panel 22 along edges 22d of the center recess panel. Once this is accomplished, the recessed portion 20 has a pocket shaped form that closes the entire opening 11 of the main panel 12. What in the deployed airbag will be the top and bottom edges 22a, 22b of the center recess panel 22 are sewn to the corresponding edges 12a, 12b of the opening 11 in the main panel.

With reference to FIGS. 5F and 5G two tethers 50, 52 are provided. As shown in FIGS. 4 and 5, the tether 50 is connected to the center recess panel 22 along a sew line 22c at location 50c on the tether 50. Additionally the opposite end 50g of the tether 50 is preferably sewn or attached at or near the bottom end 30b of the main panel 12 near the passageway 30 that is formed by the assembly of the main panel 12 and the two side panels 14, 16. Preferably the tether 50 as shown is centered on the main panel 12 and sewn in that location.

With reference to FIGS. 4, 5 and 5F, the second tether 52 is shown attached to the main panel 12 at location 12f the end 52f being sewn there. Similarly at the opposite end 52g the tether 52 can be attached preferably near the passageway 30. Although not shown, a tether 50, 52 can be provided with an extension that can form all or a portion of the diffuser element 60 which can either be an integral component of a tether 50, 52. As illustrated in FIG. 5H the diffuser element 60 can be a separate component in which case both ends would need to be sewn to the main panel 12 traversing the passageway 30 on both sides of the main panel 12. As illustrated the tether 52 secures the airbag 10 at an upper portion near or on the top portion of the main panel 12 such that in a fully extended position it is inclined with a slight vertical inclination and projects outwardly at about 45 degrees relative to the gas inlet passageway 30. This provides a restraint of the upward movement of the airbag. As shown the lower tether 50 projects outwardly either horizontally or preferably slightly below the gas inlet passageway 30 and as shown is attached to the center recess panel 22 which holds the recessed portion 20 in an open position so that upon inflation the recessed portion 20 maintains its open recessed shape relative to the inflatable chamber 301.

An alternative embodiment of the present invention is shown in FIGS. 6A through 6H. In FIGS. 6A through 6H the embodiment is substantially identical to that as shown in the FIGS. 1 through 5H. The difference occurs in that FIGS. 6D and 6E have the right and left recess panels 25, 23 of having a curved side 23c, 25c with the ends of the curved side connected by a single straight side 23d, 25d such that the outer contour of the airbag is maintained in a curvilinear fashion as previously shown, however, the recessed portion 20 initiates at a point in both locations as opposed to having a deepened flat upper portion as shown in the first embodiment. Otherwise the assembly and locations area generally the same with the exception that in this embodiment the tether 50 should be attached preferably at the location 22c to the lower portion of the recess along the lower corner at the location where the side recess panels 23, 25 intersect the main panel 12. In this fashion the recessed portion 20 is held in the open position at generally one end of the semicircular recess panels 23, 25.

As shown the airbag 10 of the present invention can be modified in such a fashion that the recessed portion 20 as formed can have a more complex configuration, however, it is important to note that the recessed portion 22 should be tethered such that forward movement of the recessed portion is restrained and that the lobe portions 40, 42 can independently react to interact with a vehicle occupant in such a fashion that the airbag can easily deform and collapse in that region in such a fashion that the vehicle occupant will not be taking the full force of the deploying airbag 10 in the lower portion as would be the case in the upper portion of the airbag striking an adult vehicle occupant. As shown the center recess panel 22 and the opening 11 are rectangular and of similar width. Alternatively the center recess panel can be made wider or narrower in width relative to the opening 11 such that the side panels are inclined making tapered side walls of the recessed portion 20. Similarly the recess center panel 22 and the opening 11 can be oval or trapezoidal in shape or preferably larger at the bottom of the recessed portion 20 and narrower as the recessed portion 20 extends toward the upper portions. All of these refinements are considered within the scope of the present invention.

As noted the airbag 10 has at least one tether attached to the center recess panel 22 at a location about halfway between the upper and lower ends 22a, 22b. The length of the upper tether 52 is greater than or equal to the sum of the length of the tether 50 attached to the center recess panel 22 and the distance from the location the tether 50 is attached to the center recess panel 22 to the main panel 12 extending along the side recess panels 24, 26 or 23, 25. The recess portion 20 preferably has a width in the inflated airbag of at least 25% of the width of the front portion of the main panel 12, preferably between 25% and 35% of the overall width. The overall length of the recess can be varied between 40% and 65% of the overall airbag height. The recessed portion 22 has a maximum depth as measured along one of the side recess panels at or below a vertical point of along the side recess panel. The maximum depth preferably being at least equal to or greater than the width of the recessed portion 22.

Figure 15:
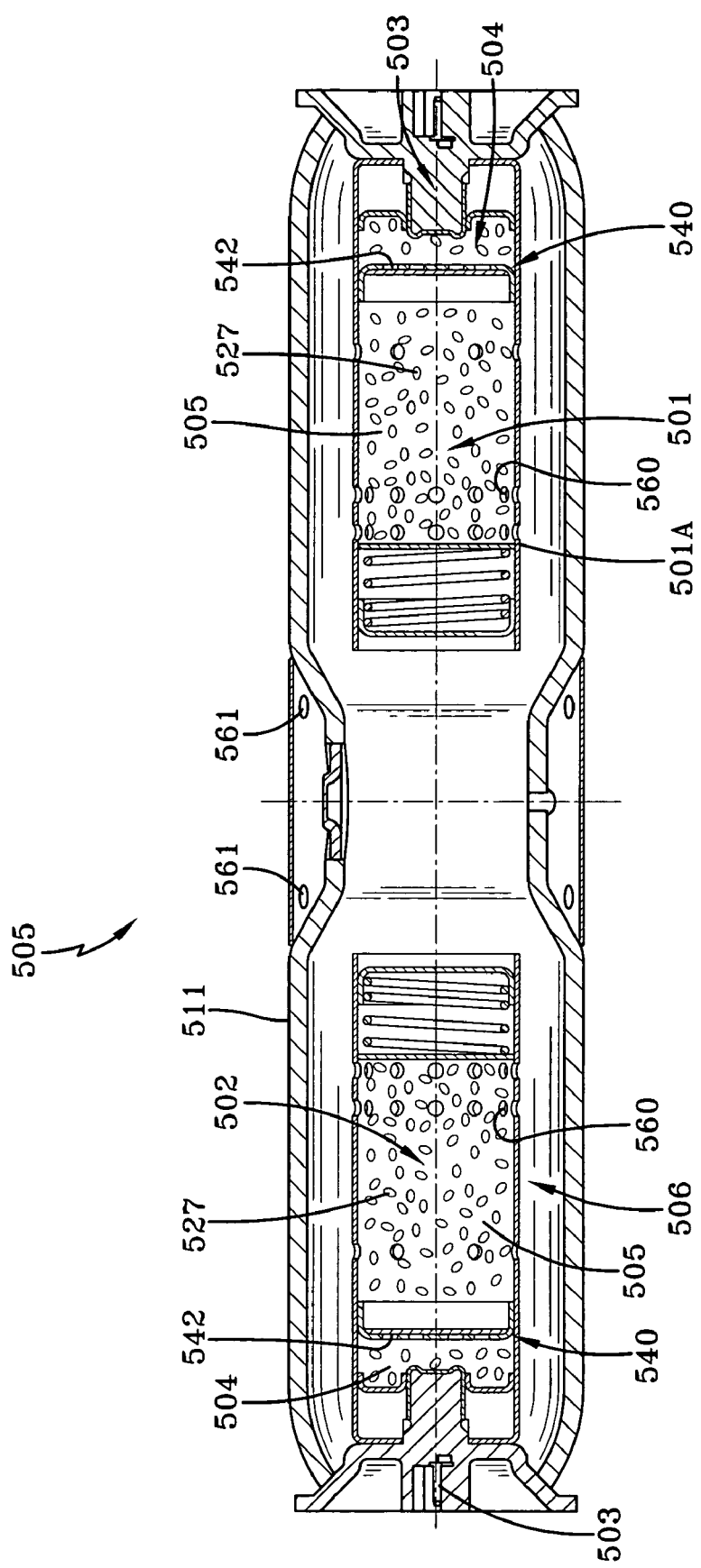
FIG. 15 is a cross sectional view of an exemplary inflator that can be used in combination with the airbag of the present invention.

An exemplary airbag 10 according to the present invention was manufactured and tested that had an overall width of 500 mm and an overall height of 650 mm with a 250 mm long recess 20 having a width of 120 mm and a depth ranging from 180 mm at the top of the recess to 235 mm at the bottom. This exemplary airbag was deployed using an inflator of the type shown in FIG. 15. This exemplary inflator is disclosed in commonly owned U.S. patent application Ser. No. 11/241,222 filed 3 Oct. 2005, which is incorporated fully herein for the purpose of disclosing an inflator that may be used in an airbag module according to the present invention. The exemplary inflator 505 has an inflator housing 511 filled with a pressurized medium containing an inert gas 506 and one or more heaters 501, 502 internal and connected at an end of said inflator housing 511. At least one of the gas heaters 501, 502 has an outer shell defining the heater housing 501a having a plurality of heater holes 560, a gas generating chamber 505 in which a generant charge 527 is stored, said gas generating chamber 505 and said inflator housing 511 being in communication with each other through said plurality of holes 560, an ignition means 503 connected to said gas heater 2 and located at an end of said inflator housing 511, and an enhancer chamber 504, in which an enhancer charge is stored is disposed between the ignition means 503 and the gas heater 501, 502. The enhancer chamber 504 is located between the gas generating chamber 505 and said ignition means 503 and is separated from said gas generating chamber 505 by a bulkhead 540. The bulkhead 540 has one or more first openings 542 leading to said gas generating chamber 505. Gas exits the inflator through passageways 561 in the inflator housing 511, then passes through the opening in the airbag to enter the inflatable chamber. This exemplary inflator 305 is a multistage type hybrid inflator that was successfully used in an evaluation test of an airbag 10 according to the present invention.

As shown in FIGS. 5A–5G and 6A–6G, the airbag panels may be separate fabric components that are attached, connected or sewn together along edges. Alternatively the fabric can be made by knitting or possibly weaving wherein the individual components are formed simultaneously or as a unitary knitted structure in such a case the present invention is equally applicable as this form of structure will have a top, front, bottom and sides with a vertically extending recessed portion 22 on the lower portion of the airbag 10 similar if not identical to the sewn panel type airbag.

An airbag according to the present invention may be a part of an airbag module 310 having a module housing 303, an inflator 305 inside the module housing 303 and the airbag 10 according to the present invention is attached to the module housing 303 and may being folded inside the module 310.

Referring to FIGS. 7–12, the airbag of the present invention airbag is a refinement of an airbag disclosed in an earlier filed priority application U.S. Ser. No. 11/252,426 filed on 17 Oct. 2005 entitled "Grooved Air Bag", with the present application being a Continuation-in-Part of that priority application. The entire specification and drawings of U.S. patent application Ser. No. 11/252,426 filed on 17 Oct. 2005 are incorporated herein by reference.

The airbag 100 shown in FIGS. 7, 7A, 8 and 9 includes a main panel 102 having a face panel portion 103, which faces the vehicle occupant to be protected, and a plurality of side panels 104a, 104b. Each of these panels is made typically from woven airbag fabric comprising nylon or polyester. The side panels 104a, 104b are substantially identical and are the mirror image of each other. Each of the side panels 104a, 104b includes a neck portion 120 and a cushion portion 122. The main panel has a pair of opposing neck portions 124 and a cushion portion 126; the face panel portion mentioned above is part of the cushion portion 126. The cushion portion, in the vicinity of the face panel portion 103 includes an opening 130, which as will described below is used to form a recess in the inflated airbag 100. The airbag is formed by sewing an edge 132 of the side panel 104a to an edge 134 of the main panel 102. Similarly edge an edge 132 of the other side panel 104b is sewn to an edge 134a of the main panel 102 in a known manner providing the airbag 100 with its general shape. Upon attachment of the various panels an inflator (not shown) is positioned within the neck of the airbag. Prior to inflation the airbag is folded and stored in a housing 306 of an airbag module 300 of which the airbag 100 is a part. An inflator 308 in the housing inflates the airbag.

Figure 10:
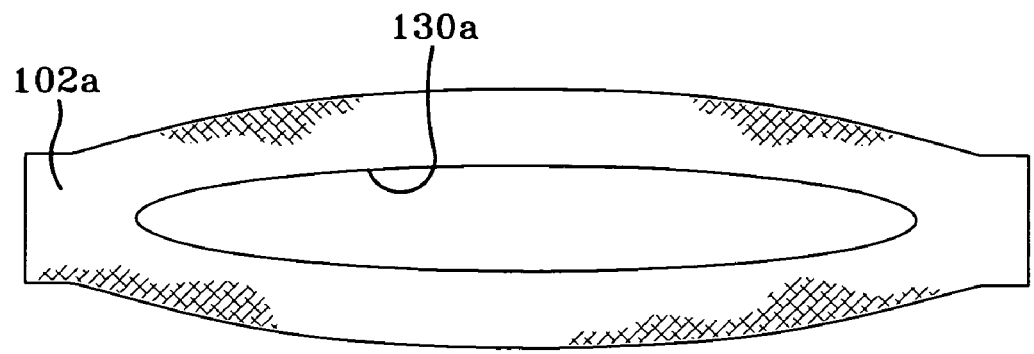
FIG. 10 shows an alternative for a component of the airbag of FIG. 7.

An opening 130 in the main panel 102 has one or more edges 140a, 140b, 140c, 140d. Even though the opening 130 is shown as rectangular in shape, the opening 130 can also be oblong, as shown in FIG. 10, which shows an alternate face panel 102a with an oval opening 130a. The opening 130b in the face panel portion can be a hybrid shape, for example a combination of trapezoidal or triangular 131 and rectangular 131 a in shape, as shown in FIG. 10A, to minimize interference with a child or small adult in an out-of-position seating position with their head or chest on or very close to the cover of the airbag module.

The airbag 100 includes a concavely shaped or cup shaped structure 149 (150, 152, 160) of fabric fitted within the opening 130 and sewn or otherwise secured to the edges 140a–140d of the main panel opening 130. The cup shaped structure 149 is located within the airbag below the exterior surface of the main panel and is used, in cooperation with a tether and other panels of fabric, to create a groove or recess 110 between opposing lobe portions 112a, 112b. This cup shaped structure 149 is formed by providing a shaped, single panel or by sewing one or more panels of fabric to the edges 140a–140d of the opening 130.

Figure 8:
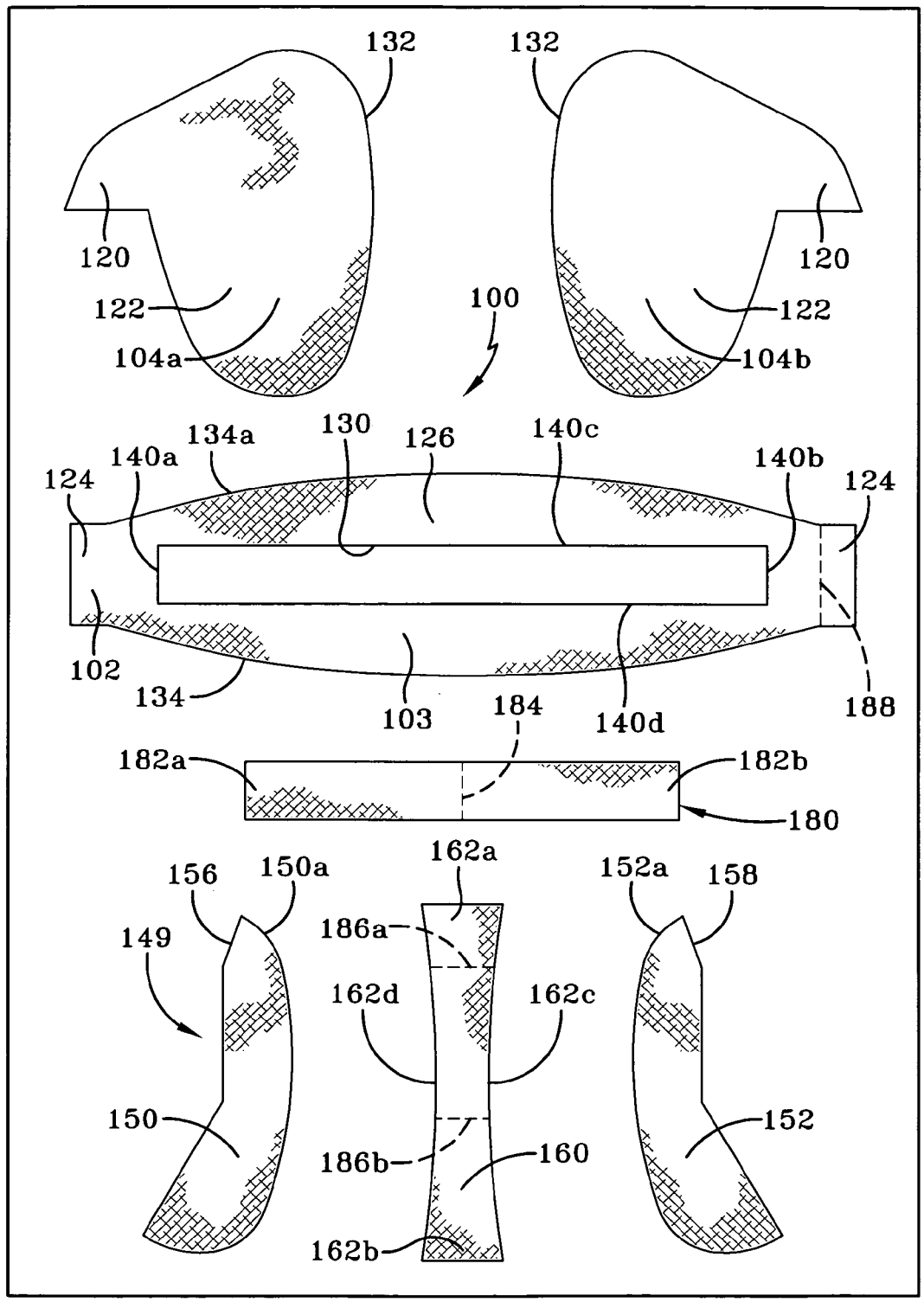
FIG. 8 is an exploded view of the various airbag components of the airbag of FIG. 7 shown prior to being sewn together.

In the embodiment illustrated in FIG. 8, the airbag 100 includes a left recess panel 150 and a right recess panel 152. An edge 150a of the left recess panel 150 is sewn to an edge 140d of the opening 130 in the main panel, while an edge 152a or the right recess panel 152 is sewn to another edge 140c of the opening 130 in main panel 102. Both the left recess panel 150 and right recess panel 152 further includes a respective side edge 156, 158 opposite edges 150a, 152a. When the side panels 150, 152 are sewn to the edges of the opening 130 of the main panel 102, they begin to provide depth to the opening 130, as well as to openings 130a, 130b. The airbag 100 further includes a center recess panel 160 having edges 162a, 162b, 162c, 162d. In general the center recess panel will follow the shape of the opening 130, 130a, 130b in the main panel. An edge 162d of the center recess panel is sewn to an edge 156 of the left recess panel 150, while another edge 162c of the center recess panel is sewn to edge 158 of the right recess panel 152. An edge 162a of the center recess panel is sewn to an edge 140a of the opening in the main panel, and another edge 162b of the center recess panel is sewn to an edge 140b of the opening in the main panel. As can be seen the panels 150, 152, 160 form the cup shaped or concave structure. Further, the concave shape of structure 149 can be formed, for example, by creating pleats 163 properly positioned about a flat piece of fabric 165.

If the cup shaped structure 149 including the three recess panels 150, 152, 160, after being sewn to the main panel 102, is pushed rearward through the opening 130 in the main panel, a recessed structure, that is, recess 110 is formed. However, if the motion of one or more of the panels 150, 152, 160 is not restrained as the airbag inflates, this concave structure 149, upon inflation of the airbag, will balloon outwardly in front of the face panel. To prevent this ballooning, the airbag 100 includes one or more tethers 180. FIG. 8 illustrates one tether. The tether 180 is a panel that includes opposed edges 182a, 182b and an intermediate point 184. The tether 180 can be secured to a portion of the module 300 such as a housing 306.

Figure 7:
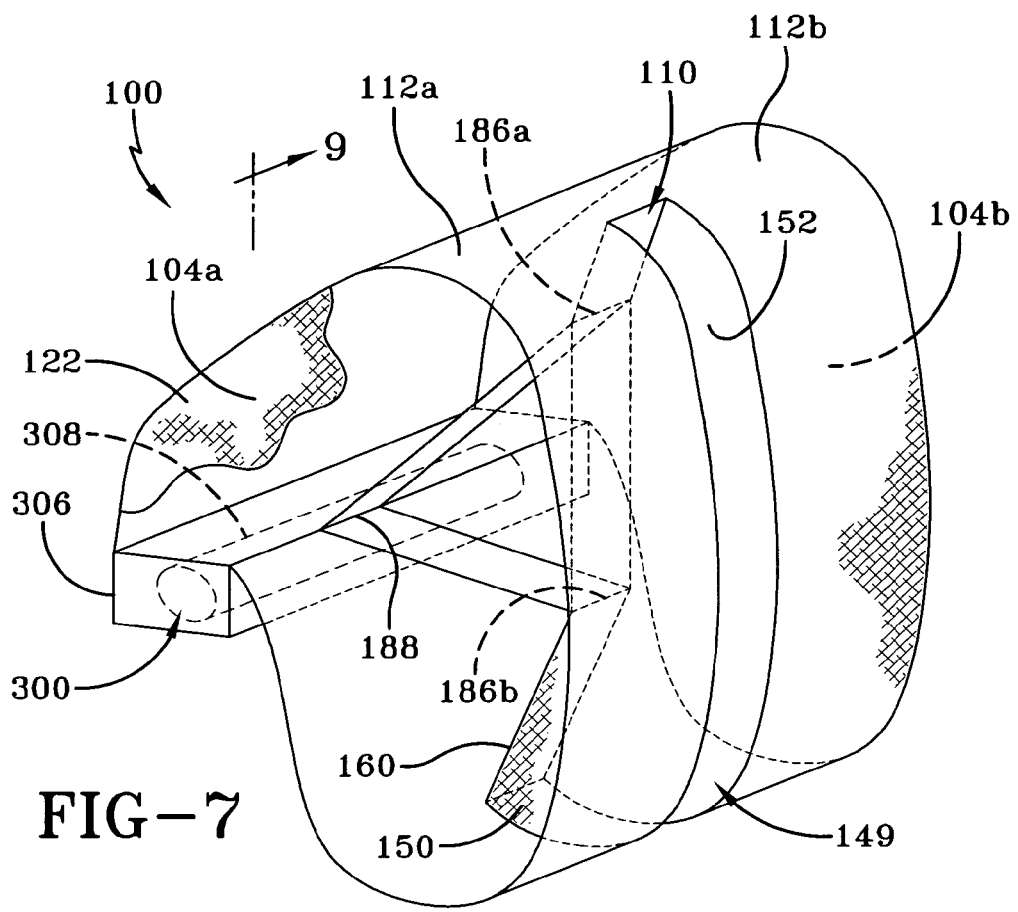
FIG. 7 is a diagrammatic view of an inflated airbag showing the invention of the Grooved Air Bag of U.S. patent application Ser. No. 11/252,426.
Figure 9:
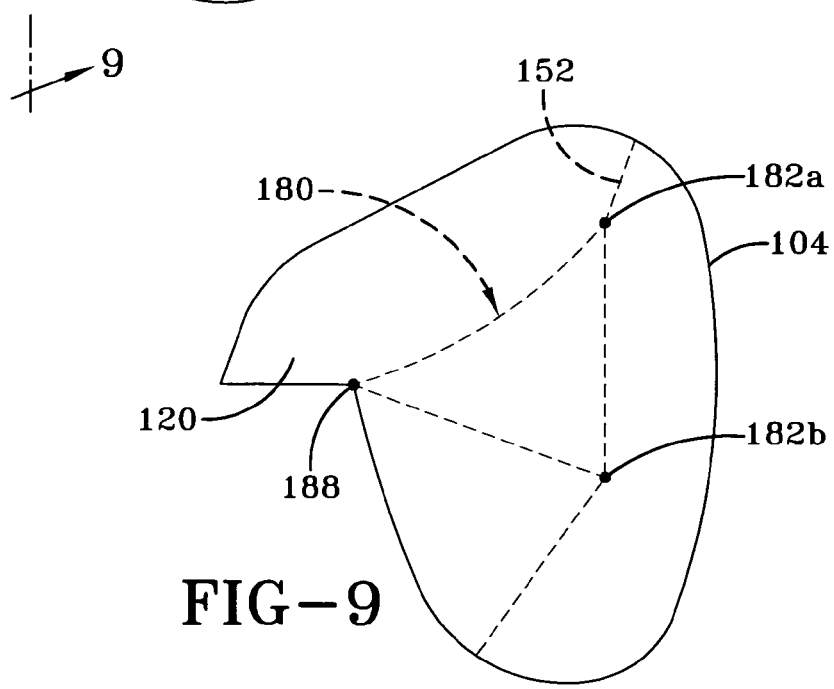
FIG. 9 is a side plan view illustrating one of the side panels of the airbag of FIG. 7, as well as a center panel shown by dashed lines and a tether shown in dotted and dashed line.

Reference is again made to FIGS. 7, 8 and 9, which illustrate the placement and location of the tether 180 in relation to the other panels forming the airbag 100. FIG. 8 illustrates, in regard to panel 160, dotted lines 186a, 186b, the connection line or seam at which edges 182a, 182b of the tether 180 are respectively sewn to the recess center panel 160. FIG. 8 also has another dotted line 188 to which the intermediate line or section 184 of the tether 180 is sewn. Upon inflation of the airbag, the tether 180 is stressed, thereby preventing the center recess panel 160, or in general the center of the structure 149, from moving outwardly relative to the lobe portions 112a, 112b, thereby creating the groove or space 110 between these lobe portions 112a, 112b and permitting the lobe portions 112a, 112b to inflate as shown in FIGS. 7 and 7A. FIG. 7A shows the typical inflated shape of airbag 100. In FIG. 7A, the airbag 100 is configured as part of a top-mount airbag module 300. The module 300 is placed, in a known manner, at the top surface of an instrument panel 302 shown in phantom line. Upon inflation of the airbag the module's cover is forced open and the airbag inflates upwardly toward the windshield 304 and forwardly toward the seated vehicle occupant. In FIG. 7A the vehicle occupant is not shown, however, the vehicle 24 is shown. The lobe portions 112a, 112b are clearly shown.

Figure 11:
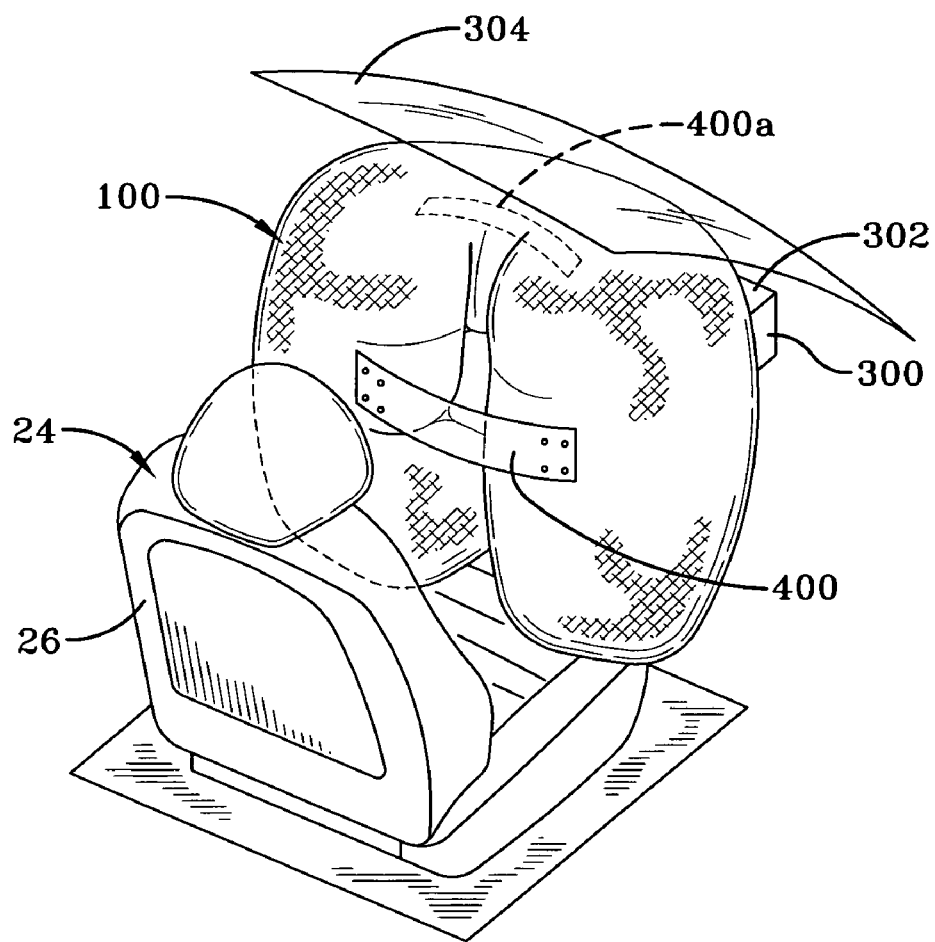
FIG. 11 shows a further alternative of the airbag of FIG. 7.
Figure 13:
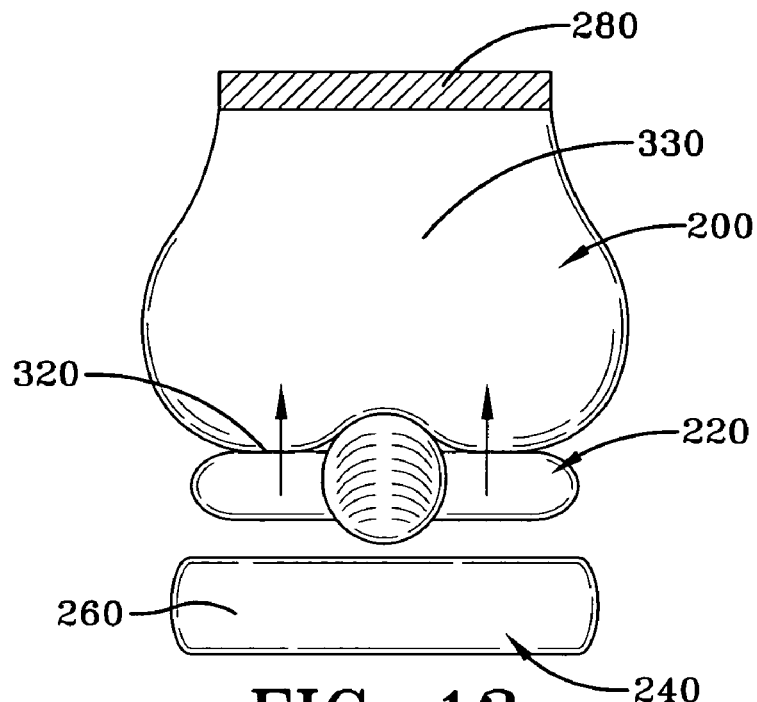
FIG. 13 is a top view of one type of prior art passenger airbag.
Figure 14:
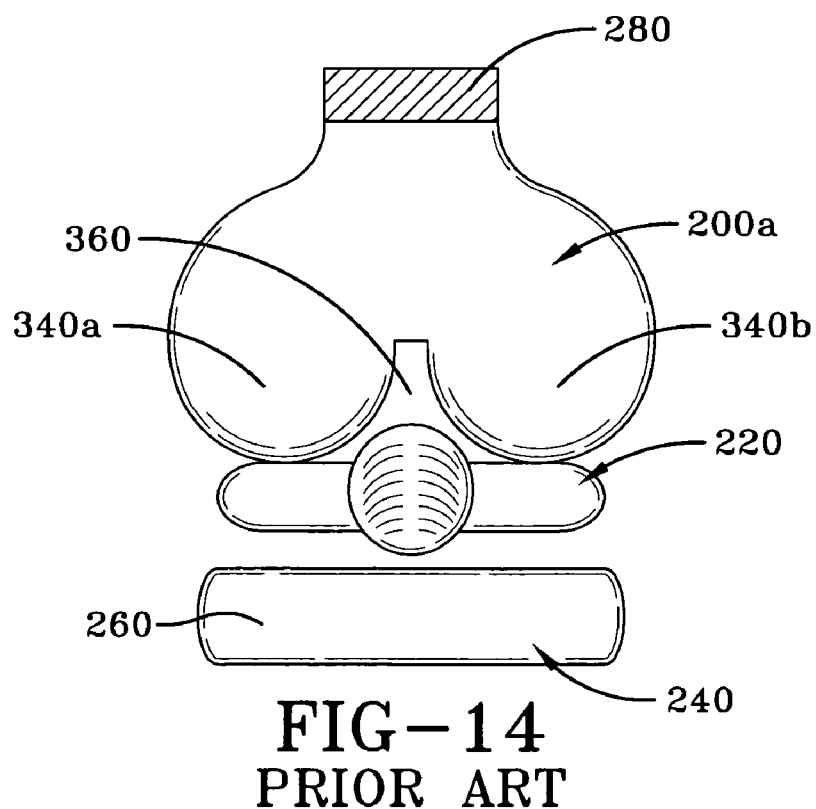
FIG. 14 is a top view of another type of prior art passenger airbag.

As the airbag 100 initially deploys outwardly during the very dynamic event of the inflation, the spacing between the inflating lobe portions 112a, 112b might increase in size greater than the steady state spacing. FIG. 11 shows a patch 400, preferably made of the same fabric as the airbag, located on the face portion 103 of the main panel 102, which joins the two lobe portions 112a, 112b and serves to limit the spacing of the lobe portions during and after inflation. The material chosen for the patch, instead of being airbag fabric, could for example be a length of woven seat belt webbing or any material capable of absorbing a tensile load. In one embodiment a patch 400a joins the tops of both lobe portions and is shown in phantom line and with the airbag inflated will in general extend horizontally between the lobe portions. In the preferred embodiment the patch 400 joins opposing middle parts of the lobe portions. In general the lower patch 400 is positioned to be below the chest of a 6 year old vehicle occupant when seated in an Out-of-Position location with his chest on the cover of the airbag module, as well as below the neck of the normally seated $50^{th}$ percentile adult vehicle occupant.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. An airbag comprising:
    a single inflatable chamber defined by a main panel and pair of side panels integral to or otherwise attached along edges of the main panel wherein the main panel has a top portion, a front portion and a bottom portion and the inflatable chamber has a gas inlet passageway anchored at an end for allowing inflation gases to enter to fill the inflatable chamber;
    a vertically oriented recessed portion on the main panel located only in a lower portion of the airbag dividing the inflatable chamber into two lower lobe portions; and
    at least one internal tether attached to the recessed portion and anchored at the gas inlet passageway, thereby limiting forward movement of the recessed portion upon inflation of the inflatable chamber.

2. The airbag of claim 1 wherein the recessed portion extends from the front portion of the main panel to and at least partially into the bottom portion of the main panel.

3. The airbag of claim 1 wherein the lower recessed portion begins at or below a vertical location equal or less than a vertical location of a gas inlet passageway for inflation gases to enter the inflatable chamber.

4. The airbag of claim 1 further comprising a second upper internal tether attached to the top portion of the main panel and anchored at the gas inlet passageway thereby limiting forward movement of an upper portion of the inflatable chamber.

5. The airbag of claim 4 further comprising an internal diffuser element, the diffuser element being attached at two ends of the main panel and spanning across the gas inlet passageway to redirect incoming inflation gases toward each side panel.

6. The airbag of claim 1 wherein the recessed portion comprises a center recess panel and a pair of side recess panels, edges of the side recess panels being attached to or integrally formed with lateral edges of an opening in the front portion of the main panel and the center recess panel being attached to or integrally formed with upper and lower ends of the opening and to edges of each side panel to form the recessed portion.

7. The airbag of claim 6 wherein the at least one tether is attached to the center recess panel at a location about halfway between the upper and lower ends.

8. The airbag of claim 7 wherein the length of the upper tether is greater than or equal to the sum of the length of the tether attached to the center recess panel and the distance from the location the tether is attached to the center recess panel to the main panel extending along the side panels.

9. The airbag of claim 1 wherein the recessed portion has a width in the inflated condition of at least 25% of the width of the front portion of the main panel.

10. The airbag of claim 6 wherein the recessed portion has a maximum depth as measured along one of the side recess panels at or below a vertical mid point of the side recess panel.

11. The airbag of claim 10 wherein the side recess panels are generally symmetrically curved along the edge attached to or integrally formed with the main panel.

12. The airbag of claim 10 wherein the side recess panels have a arcuate lower edge and a flat upper edge and a flat lower edge and wherein the tether is attached to the center recess at the inner most location of the flat upper edge.

13. The airbag of claim 1 wherein the main panel, side panels and the recessed portion are attached by being sewn or stitched along the respective edges.

14. The airbag of claim 1 wherein the main panel, side panels and recessed portion are woven or knitted to form the airbag.

15. The airbag of claim 1 wherein the combination of the main panel, the side panels and the recessed portion are formed by any combination of sewing, knitting or weaving to form the airbag.

16. An airbag comprising:
a main panel having a top portion, a front portion and a bottom portion wherein ends of the top and bottom portions form a portion of a gas inlet passageway for inflation gases;
a pair of side panels, each connected to the main panel along lateral edges, and having an end, the combination of ends of the side panels and the two ends of the main panel form the gas inlet passageway;
a diffuser element located in the gas inlet passageway and being generally centered and attached to the two ends of the main panel;
a pair of internal tethers each extending from the gas inlet passageway adjacent or anchored to the diffuser element to locations on the main panel, one upper tether being inclined upwardly the other lower tether extending outwardly at or below a horizontal location of the gas inlet passageway; and wherein the main panel has a lower vertical recessed portion defined by center recess panel, a pair of side recess panels, the side recess panels being attached or integrally connected along side edges of an opening in the main panel at a location extending from the front portion to the bottom portion, the recess center panel being attached the side recess panel along edges internal of the main panel and wherein the center recess panel is attached to an end of the lower tether.

17. An airbag module comprising;
a module housing,
an inflator internal of the module housing; and
an airbag attached to the module housing, the airbag comprising:
a single inflatable chamber defined by a main panel and pair of side panels integral to or otherwise attached along edges of the main panel wherein the main panel has a top portion, a front portion and a bottom portion and the inflatable chamber has a gas inlet passageway anchored at an end for allowing inflation gases to enter to fill the inflatable chamber;
a vertically oriented recessed portion on the main panel located only in a lower portion of the airbag dividing the inflatable chamber into two lower lobe portions; and
at least one internal tether attached to the recessed portion and anchored at the gas inlet passageway, thereby limiting forward movement of the recessed portion upon inflation of the inflatable chamber.

* * * * *